(No Model.)

G. D. BURTON.
REGISTERING APPARATUS.

No. 264,238. Patented Sept. 12, 1882.

Witnesses.
John F. C. Brinkel
Bernice J. Noyes

Inventor.
George D. Burton
by Crosby & Gregory
Attys.

UNITED STATES PATENT OFFICE.

GEORGE D. BURTON, OF NEW IPSWICH, NEW HAMPSHIRE, ASSIGNOR TO THE FRANCES REGISTERING MACHINE COMPANY, OF BOSTON, MASS.

REGISTERING APPARATUS.

SPECIFICATION forming part of Letters Patent No. 264,238, dated September 12, 1882.

Application filed May 8, 1882. (No model.)

*To all whom it may concern:*

Be it known that I, GEORGE D. BURTON, of New Ipswich, county of Hillsborough, State of New Hampshire, have invented an Improvement in Registering Apparatus, of which the following description, in connection with the accompanying drawings, is a specification.

My invention relates to a registering apparatus for indicating the number of movements made by machinery—such, for example, as the number of impressions made by a printing-press—and has for its object to provide a positively-operating mechanism of simple construction.

The registering-dial has three concentric graduated circles co-operating with three hands of different lengths rotating on the same geometrical axis, one of the said hands being mounted upon the spindle of a gear positively moved, tooth by tooth, by a pawl operated by a cam which is actuated by the mechanism the strokes, revolution, or movements of which are to be counted. The said gear is provided with a pinion, which meshes with an intermediate gear having a pinion engaging with a second gear mounted in a sleeve surrounding the axis of the first-mentioned gear. The said sleeve carries another hand or pointer, and it in turn is provided with a pinion, which, by a similar intermediate gear and pinion, determines the movement of the third gear mounted on a sleeve outside that of the second gear, and also carrying a pointer. By this arrangement the three main pointer carrying gears rotate on the same geometrical axis, their arbors being concentric with one another, and the said gears and pinions and the intermediate gears and pinions are all of the same size, the relation between the gears and pinions being such that the one actuated directly by the machinery that is being recorded will make one hundred revolutions, each revolution representing one hundred movements of the said machinery, while the next gear, with its count hand or pointer, is making one revolution, and the latter will make one hundred revolutions, each representing ten thousand movements of the machinery being recorded, while the next more slowly-moving gear and hand is making one revolution. The complete revolution of the last-mentioned gear and pointer represents one million movements of the machinery being counted.

Figure 1:
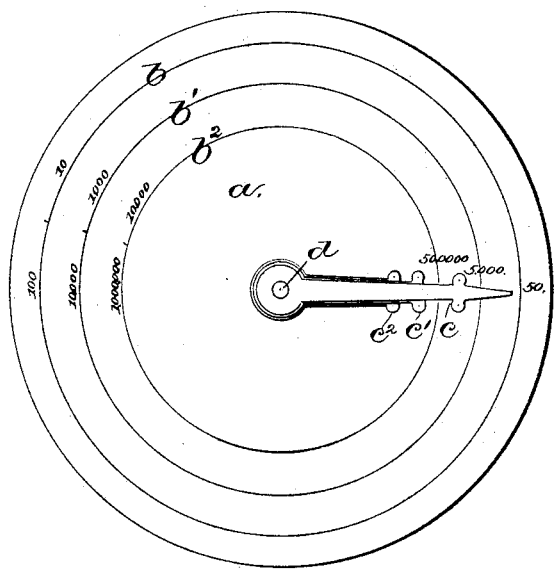
Figure 2:
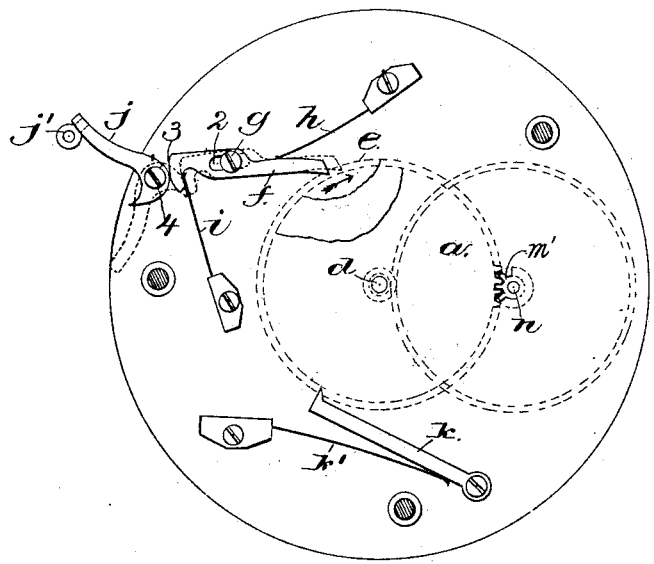
Figure 3:
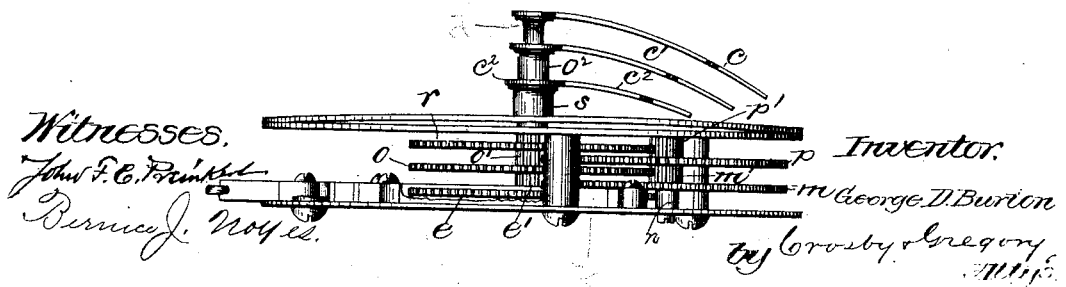

Figure 1 is a top view of a registering apparatus constructed in accordance with this invention, it showing the dial and pointers; Fig. 2, a similar view with the dial and pointers removed, showing the devices for actuating the gear and counting-pointer; and Fig. 3, an edge view thereof.

The dial $a$ is provided with a series of concentric graduations, $b$ $b'$ $b^2$, (shown in this instance as each divided into one hundred divisions,) the said graduated circles co-operating with pointers $c$ $c'$ $c^2$, (see Fig. 3,) to indicate a total number, they being shown in this instance as indicating the number 505,050. The longest hand, $c$, co-operating with the outermost circle, is the most rapid in moving, it turning a complete revolution while the next hand, $c'$, is moving over one division of its circle, or making one one-hundredth of a revolution. The said hand $c$ is frictionally held on an arbor, $d$, carrying a gear, $e$, which is in this instance provided with one hundred teeth. A sliding pawl, $f$, slotted at 2 to receive a guide-pin, $g$, has its end pressed by the spring $h$ toward the teeth of the said gear $e$, while its rear end is provided with a cam-surface, 3, pressed by a spring, $i$, against the actuating-cam $j$, pivoted at 4, and provided with an eye, $j'$, by which it may be connected with the machinery, so as to be oscillated from the full to the dotted line position by each movement of the said machinery that is to be recorded. When the said cam $j$ is oscillated in this direction it moves the pawl $f$ to the position shown in dotted lines, thus rotating the gear $e$ for the space of one tooth in the direction shown by the arrow, Fig. 2. A retaining-pawl, $k$, operated by the spring $k'$, prevents backward rotation of the gear $e$ when the pawl $f$ is moved back to its normal position (shown in full lines) by the action of the spring $i$, when the cam $j$ is restored to its dotted-line position in the movement of the machinery. The gear $e$ is provided with a pinion, $e'$, meshing with an intermediate gear, $m$, mounted loosely on an arbor, $n$, and having connected therewith a pinion, $m'$, meshing with a gear, $o$, mounted on a sleeve, $o^2$, that turns loosely on the arbor $d$ of the gear $e$, the said sleeve having the hand or pointer $c'$ frictionally held therein and rotating therewith. The said gear $o$ also carries a pinion, $o'$, meshing with another intermediate gear, $p$, also mounted loosely on the arbor $n$ of the gear $m$, and provided with a pinion, $p'$, meshing with a gear, $r$, upon a sleeve, $s$, which turns loosely on the sleeve-arbor $o^2$ of the gear $o$, and carries the hand $c^2$, frictionally held thereon. The gears $e\ m\ o\ p\ r$ are shown as all of exactly the same size, and in this instance each provided with one hundred teeth, while the corresponding pinions, $c'\ m'\ o'\ p'$, are all of the same size, each having ten teeth, so that of the three concentric gears $e\ o\ r$ the former makes one hundred revolutions to one revolution of the next one, and ten thousand revolutions to each revolution of the last one of the series.

By this arrangement a very compact registering device is produced, of simple construction and positive in operation, capable of registering a very large number, and the gears being all of the same size, and the pinions also being all of the same size, the apparatus can be made very cheaply.

This apparatus may be employed in connection with any machinery having parts whose rotations or reciprocations it is desired to record, and in some instances it may be necessary to employ but two hands and two sets of figures.

I claim—

The combination, with the series of gears and pinions mounted on concentric arbors and provided with pointers, of intermediate gears and pinions mounted loosely on the same axis, and the actuating-cam $j$ and pawl $f$, engaging the teeth of one of the said gears to positively operate the said gearing and pointers, substantially as described.

In testimony whereof I have signed my name to this specification in the presence of two subscribing witnesses.

GEORGE D. BURTON.

Witnesses:
G. W. GREGORY,
JOS. P. LIVERMORE.